(12) United States Patent  
Noll et al.

(10) Patent No.: US 12,408,590 B2
(45) Date of Patent: Sep. 9, 2025

(54) RIGID CUTTERBAR OVER TRAVEL

(71) Applicant: CNH Industrial America LLC, New Holland, PA (US)

(72) Inventors: Blaine Noll, Fleetwood, PA (US); Joel Cook, Akron, PA (US); Nathaniel Smith, Lancaster, PA (US); Herb Farley, Elizabethtown, PA (US); Jethro Martin, Ephrata, PA (US); Scott Deichmann, Phoenixville, PA (US)

(73) Assignee: CNH Industrial America LLC, New Holland, PA (US)

( * ) Notice: Subject to any disclaimer, the term of this patent is extended or adjusted under 35 U.S.C. 154(b) by 751 days.

(21) Appl. No.: 17/845,046

(22) Filed: Jun. 21, 2022

(65) Prior Publication Data

US 2023/0403977 A1 Dec. 21, 2023

(51) Int. Cl.
*A01D 34/28* (2006.01)
*A01D 41/14* (2006.01)
*A01D 75/18* (2006.01)

(52) U.S. Cl.
CPC ......... *A01D 41/145* (2013.01); *A01D 41/141* (2013.01)

(58) Field of Classification Search
CPC ...... A01D 34/28; A01D 34/286; A01D 34/24; A01D 34/243; A01D 34/246; A01D 34/283; A01D 41/14; A01D 41/141; A01D 41/145; A01D 75/182
See application file for complete search history.

(56) References Cited

U.S. PATENT DOCUMENTS

| | | | | |
|---|---|---|---|---|
| 4,199,925 | A * | 4/1980 | Quick | A01D 41/141 56/208 |
| 5,983,615 | A * | 11/1999 | Schmid | A01D 41/14 56/DIG. 1 |
| 7,669,392 | B2 * | 3/2010 | Ehrhart | A01D 34/283 56/10.2 E |
| 7,987,656 | B2 * | 8/2011 | Ehrhart | A01D 75/28 56/208 |
| 9,402,343 | B1 * | 8/2016 | Allochis | A01D 34/283 |
| 9,452,512 | B2 * | 9/2016 | Joyce | B25B 13/481 |
| 10,299,437 | B2 * | 5/2019 | Farley | A01D 34/04 |

(Continued)

FOREIGN PATENT DOCUMENTS

| | | |
|---|---|---|
| EP | 2732689 A1 | 5/2014 |
| EP | 3549433 A1 | 10/2019 |

(Continued)

OTHER PUBLICATIONS

International Search Report and Written Opinion for PCT/US2023/025859 dated Oct. 12, 2023 (13 pages).

*Primary Examiner* — Adam J Behrens
(74) *Attorney, Agent, or Firm* — Buchanan Ingersoll & Rooney PC

(57) ABSTRACT

A cutter bar assembly for an agricultural vehicle header includes a cutter bar supported by movable arms extending from a header frame and capable of operation in flex and rigid modes. The support arms are joined to the header frame such that they may be displaced from a raised position in the rigid mode when subjected to a lifting force due to striking an obstacle without damage to the header structure. Also, an agricultural vehicle header and an agricultural combine harvester includes the cutter bar assembly.

20 Claims, 7 Drawing Sheets

(56) References Cited

U.S. PATENT DOCUMENTS

| | | | |
|---|---|---|---|
| 10,568,266 B2 | 2/2020 | Vandeven et al. | |
| 10,624,260 B2* | 4/2020 | Shearer | A01D 61/02 |
| 11,109,529 B2* | 9/2021 | Fuechtling | A01D 34/04 |
| 2009/0277145 A1* | 11/2009 | Sauerwein | A01D 41/141 |
| | | | 56/208 |
| 2010/0000191 A1* | 1/2010 | Ehrhart | A01D 34/283 |
| | | | 56/10.2 E |
| 2010/0083629 A1* | 4/2010 | Klotzbach | A01D 41/14 |
| | | | 56/320.1 |
| 2011/0232251 A1* | 9/2011 | Figgins | A01D 41/141 |
| | | | 56/17.1 |
| 2014/0075912 A1* | 3/2014 | Fuechtling | A01D 43/06 |
| | | | 56/181 |
| 2015/0319920 A1* | 11/2015 | Joyce | A01D 34/283 |
| | | | 81/177.1 |
| 2020/0337227 A1* | 10/2020 | Yanke | A01D 34/246 |
| 2021/0212254 A1* | 7/2021 | Thomas | A01B 73/00 |
| 2023/0076930 A1* | 3/2023 | Modak | A01D 41/141 |
| 2023/0240179 A1* | 8/2023 | Pierson | A01D 41/14 |
| | | | 56/257 |

FOREIGN PATENT DOCUMENTS

| | | | | |
|---|---|---|---|---|
| FR | 2749124 A1 * | 12/1997 | | A01D 33/14 |
| WO | 2020/101859 A1 | 5/2020 | | |

* cited by examiner

RIGID CUTTERBAR OVER TRAVEL

FIELD OF THE INVENTION

The present invention is related to combine harvesters, in particular to a header for a combine harvester, more particularly to a mechanism for protecting the cutterbar and infeed of a combine header against damage from striking obstacles in a rigid operating mode.

BACKGROUND OF THE INVENTION

Agricultural combine harvesters are vehicles for harvesting and processing crops such as wheat or corn. A combine harvester typically includes a laterally-extending header that is movably attached to the front of the combine chassis. Crops are cut from the field by a cutter bar extending across the front of the header. An auger or a belt (draper) system brings the cut material to a central area of the header, and from there an infeed mechanism transports the cut crops to the interior of the vehicle to a threshing mechanism and further to a cleaning section, where grains are separated from crop residue.

The header typically is located at the front of the vehicle and extends laterally relative to the vehicle's direction of travel. The header can be a single rigid body, or it can be a multi-segment or articulated header, comprising multiple sections that are movable relative to each other and to the vehicle chassis. Hydraulic or pneumatic cylinders, screws, springs, or other actuators, linkages, and the like may be provided to selectively control the positions of the header and its constituent parts. During operation, the header and/or cutter bar might be raised or lowered to account for variations in the ground level, properties of the particular crop being harvested, or various other operating conditions or requirements.

Thus, a typical header might be pivotally mounted to the vehicle chassis by way of a feeder housing that can be moved up and down to raise and lower the entire header. The header also may include a forward tilt adjustment mechanism that rotates the entire header forward and backward to change the angle of the header relative to the ground. Still further, the header might have a lateral tilt adjustment mechanism to rotate the header about the fore-aft axis to account for different ground levels in the lateral direction. A header having height and tilt adjust mechanisms may be operated by actively raising and lowering the header to account for undulations in the ground. Ground distance sensing equipment located below the header signals the header height position controller to raise and lower the entire mass of the header to avoid damaging contact with irregular ground or obstacles.

The cutter bar is disposed forward of the header frame on movable supports that allow the cutter bar to move relative to the header frame. Various cutter bar support systems are known in the art. For example, the cutter bar may be mounted on support arms that are mounted on the header frame by a pivot connection. Still further, the cutter bar may comprise a flexible cutter bar that is supported by multiple independently-movable supports along its lateral extent, allowing the cutter bar to flex to conform more precisely to lateral undulations in the terrain. In a typical arrangement, a support arm is pivotably attached at its aft or proximal end to the header main frame, and a stop link is provided between the support arm and the header frame to limit upward and downward movement of the support arm relative to the frame.

For certain harvesting operations requiring cutting crops close to the ground, the support arms are freely movable relative to the header frame, and the cutter bar flexes up and down on support arms tracking the local shape of the ground below each support arm (flex mode). For other operations, it is desirable or necessary to secure or lock the movable supports to fix the cutter bar in a stationary position with respect to the header main frame (rigid mode). For example, it is common to lock the cutter bar support arms in a raised position during transport of the harvester over fields and other terrain, to prevent the cutter bar from bouncing or from striking the ground or other terrestrial obstacles encountered by the moving harvester. In still other operations, it may be desirable to lock the cutter bar at an intermediate or even a completely lowered position. To facilitate locking of the cutter bar, the support arms may be provided with stop links that limit their upward or downward movement.

When the cutter bar in such a system is locked in a raised position in the rigid mode, the support arm cannot move upward any further relative to the header. In the center section of the header, where the infeed frame acts as the support arm for the cutter bar, there is an area where the ground or obstacles may not be sensed or may be sensed only poorly by the header position control system. If an obstacle is encountered near the infeed and not detected as the header passes over, and the control system does not react to lift the header, contact between the locked cutter bar or header infeed section and the obstacle may occur to the point where damage is inflicted on the header structure. This damage can be minimal (bending mounting pins) or major (bending, e.g., the entire infeed frame). While the state of the art provides various alternatives to avoid header damage due to unintended ground contact, there remains a need to advance the state of the art.

This description of the background is provided to assist with an understanding of the following explanations of exemplary embodiments, and is not an admission that any or all of this background information is necessarily prior art.

SUMMARY OF THE INVENTION

In one exemplary aspect, there is provided a cutter bar assembly for an agricultural vehicle header having a header frame, at least one support arm extending from the header frame in a forward direction, the support arm joined to the header frame at an end proximal to the header frame by a pivot, a cutter bar attached to a respective distal end of each at least one support arm, and a stop link. The stop link has first and second ends, wherein the first end joins one of the header frame or the support arm by a pivot and the second end joins the other of the header frame or the support arm by a sliding joint, and wherein the stop link joins the header frame at a point distal from the pivot joining the support arm to the header frame. A hydraulic actuator is joined at one end to the header frame by a pivot and at an opposite end to the support arm by a sliding joint, wherein the actuator can lift and hold the support arm in a raised position in a rigid mode. The sliding joint joining the hydraulic actuator to the support arm and the stop link enable the support arm to move upward from the raised position in the rigid mode to the over-traveled position when the support arm is subjected to a lifting force at its distal end.

In some exemplary aspects, the at least one support arm is or forms a part of an infeed frame supporting the infeed section of a header.

In some exemplary aspects, the sliding joint of the stop link is a pin slot joint formed by a slot in the stop link and a pin fixed respectively either to the header frame or the support arm. The stop link may be joined by a pivot to the support arm and by a sliding joint to the header frame. The stop link may be joined to the header frame at a point below the pivot joining the support arm to the header frame.

In some exemplary aspects, the sliding joint joining the actuator to the support arm is a pin slot joint formed by a pin fixed to the actuator and a slot fixed to the support arm.

In some exemplary aspects, the cutter bar assembly further includes an actuator link joined to the header frame and support arm in parallel with the hydraulic actuator to limit travel of the hydraulic actuator. The actuator link may be joined to the header frame and support arm by at least one sliding joint. The sliding joints may be formed by a slot in the actuator link and a pin fixed respectively to either or both of the header frame and the support arm.

In some exemplary aspects, the stop link may further incorporate a spring or spring mechanism. The stop link may also incorporate a strain gauge sensor or a load cell sensor for detecting when the support arm is subjected to a lifting force at its distal end.

In some exemplary aspects, the support arm incorporates a position sensor for detecting when the support arm is moved upward from the raised position in the rigid mode by a lifting force at its distal end.

In some exemplary aspects, there is further provided an agricultural vehicle header incorporating the cutter bar assembly. The header may be provided with a header position control system, and the cutter bar assembly may be provided with a position sensor for detecting when the support arm is moved upward from the raised position in the rigid mode by a lifting force at its distal end and signalling the header position control system to raise the header. In some exemplary embodiments, there is provided an agricultural combine harvester incorporating the agricultural vehicle header.

In some exemplary aspects, there is provided a cutter bar assembly for an agricultural vehicle header having a header frame, an infeed frame extending from the header frame in a forward direction, the infeed frame joined to the header frame at an end proximal to the header frame by a pivot, and a cutter bar attached to a respective distal end of the infeed frame A stop link is joined by a pivot to the infeed frame and by a pin slot joint to the header frame, wherein the pin slot joint comprises a slot in the stop link and a pin fixed to the header frame at a point below the pivot joining the infeed frame to the header frame. A hydraulic actuator is joined at one end to the header frame by a pivot and at an opposite end to the support arm by a sliding joint formed by a pin slot joint formed by a pin fixed to the actuator and a slot fixed to the infeed frame, wherein the actuator can lift and hold the infeed frame in a raised position in a rigid mode. The sliding joint joining the hydraulic actuator to the infeed frame and the stop link enable the infeed frame to move upward from the raised position in the rigid mode when the infeed frame is subjected to a lifting force at its distal end. The cutter bar assembly further has an actuator link joined by sliding joints to the header frame and infeed frame in parallel with the hydraulic actuator to limit travel of the hydraulic actuator, wherein the sliding joints joining the actuator link to the header frame and infeed frame are formed by a slot in the actuator link and a pin fixed respectively to each of the header frame and the infeed frame. The cutter bar assembly further has a position sensor for detecting when the infeed frame is moved upward from the raised position in the rigid mode by a lifting force at its distal end. In a further exemplary aspect, there is provided an agricultural vehicle header, and the infeed frame position sensor signals the header position control system to raise the header when the position sensor detects the infeed frame is moved upward from the raised position in the rigid mode by a lifting force at its distal end.

BRIEF DESCRIPTION OF THE DRAWINGS

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown. Embodiments of inventions will now be described, strictly by way of example, with reference to the accompanying drawings, in which.

DETAILED DESCRIPTION OF PREFERRED EMBODIMENTS OF THE INVENTION

Figure 1:
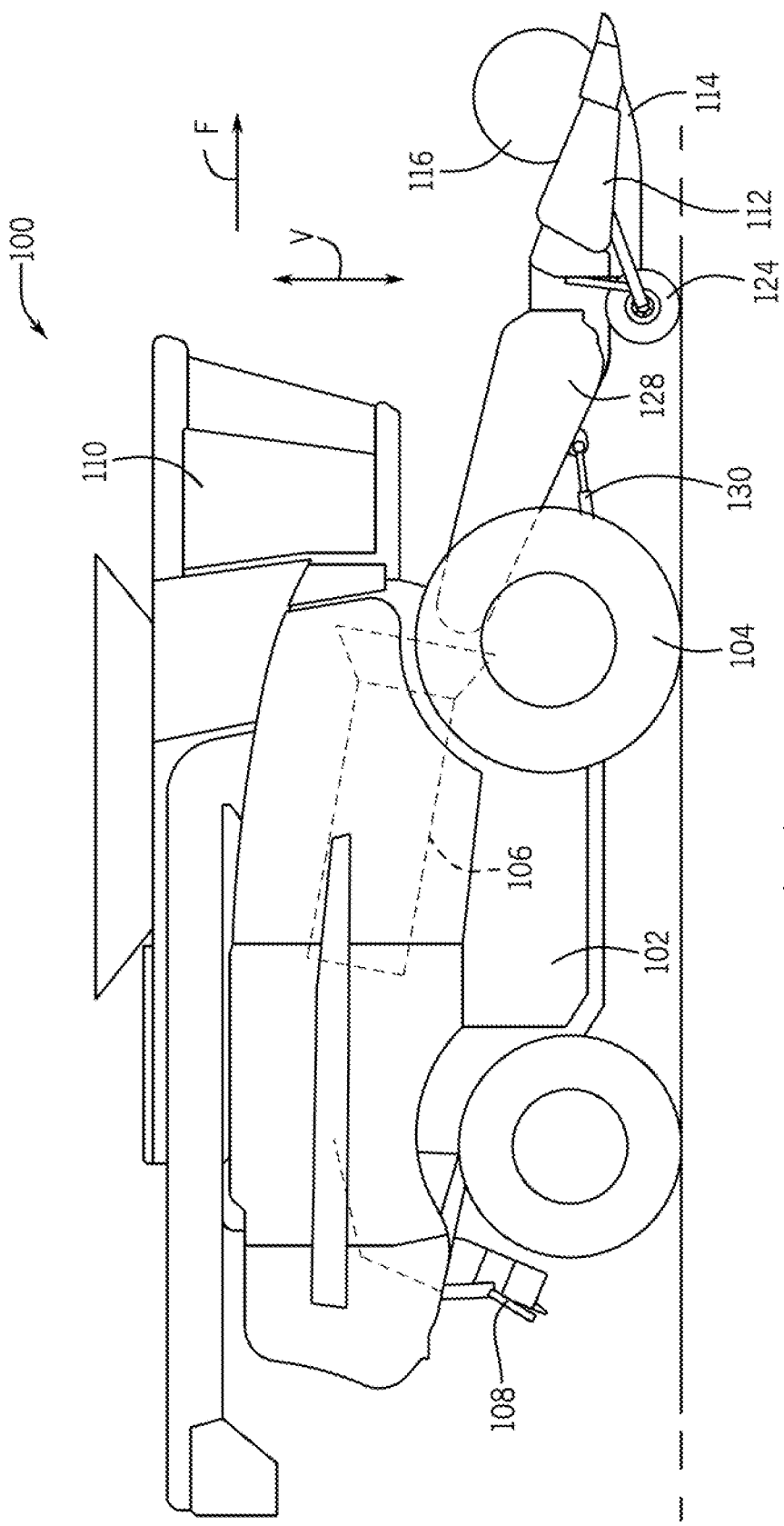
FIG. 1 is a side view of an agricultural combine harvester.

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown. Exemplary embodiments of the present invention provide cutter bar and draper support assemblies for headers for agricultural equipment, such as combines, swathers, windrowers, and the like. It will be appreciated that other embodiments may be used in other types of machines having a similar arrangement of parts, upon incorporation of the appropriate features of the inventions herein. The detailed description is not limiting the scope of the invention, which is defined only by the appended claims.

Preferred embodiments will now be described with reference to the drawings. The terms 'front' and 'back' or 'rear' are referenced to the front and back side of the agricultural combine harvester. The 'forward direction' of the agricultural combine harvester refers not to a single geometrical axis but to the general direction from the rear of the vehicle to the front.

FIG. 1 illustrates an example of an agricultural combine 100, with which embodiments of the invention may be used. The combine 100 includes a chassis 102 that is configured for driving on a surface (e.g., the ground or a road), such as by being supported by pneumatic wheels 104, tracked wheel assemblies, or the like. The combine 100 includes a threshing and separating system 106 mounted on or within the chassis 102. The threshing and separating system 106 may include mechanisms such as one or more threshers (e.g., an axial flow thresher), sieves, blowers, and the like, as well as an associated grain hopper and unloader. Threshing and separating systems 106 and their associated components are well-known in the art, and need not be described in detail herein. The combine 100 also may include other features, such as a spreader 108, operator cab 110, and the like.

Figure 2:
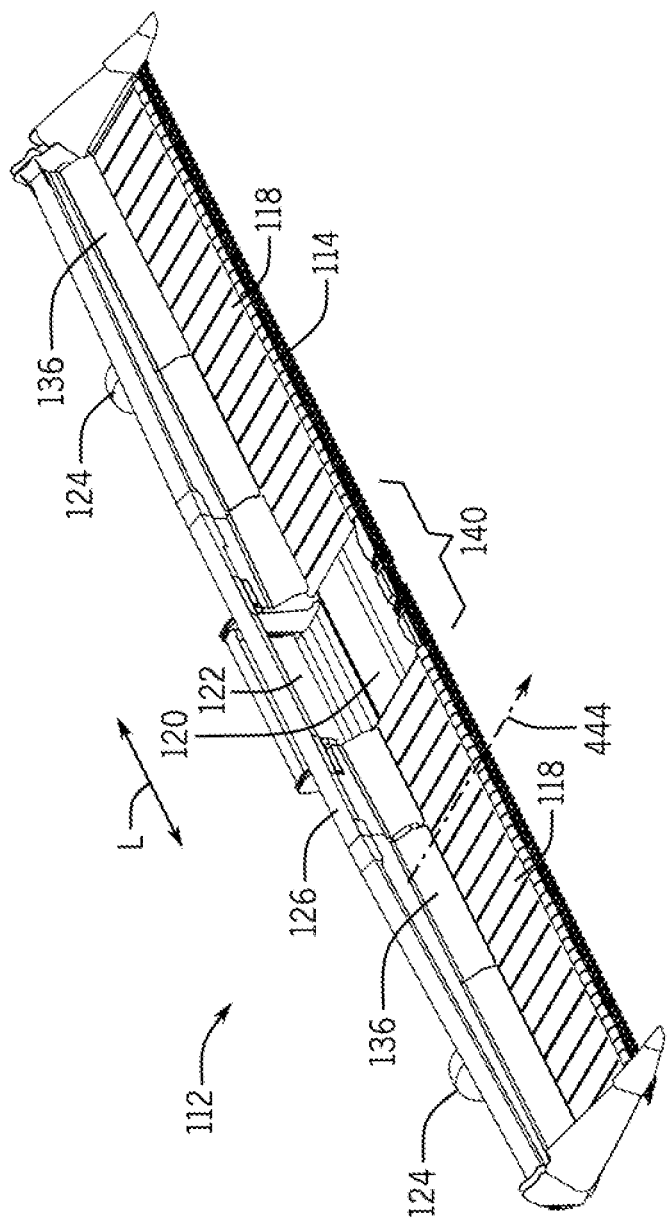
FIG. 2 is an isometric view of a header.
Figure 3:
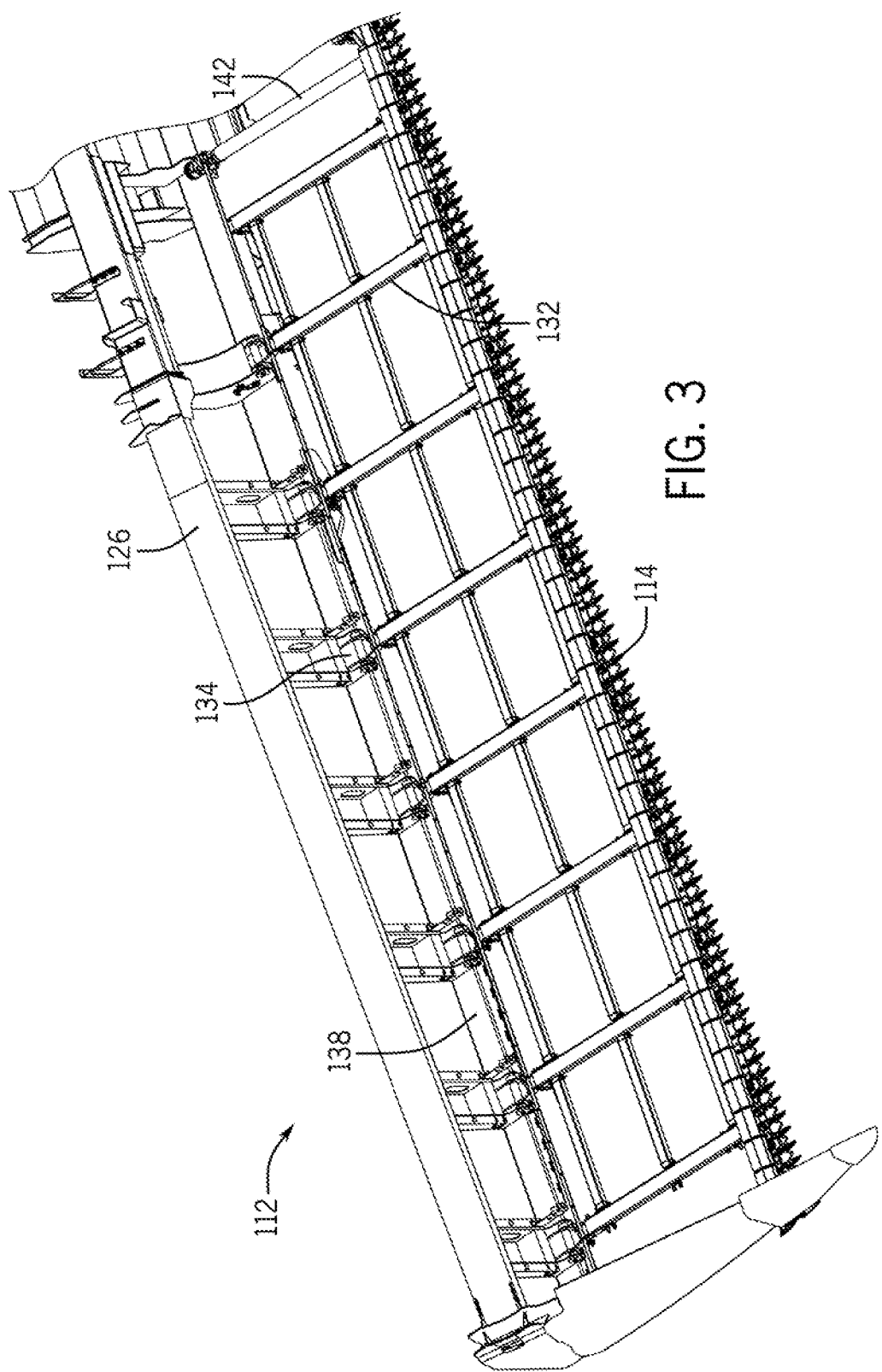
FIG. 3 is an isometric view of a portion of a header frame.

Referring also to FIGS. 2 and 3, the combine 100 also includes a header 112, which is configured to cut and harvest crop material from the ground as the combine 100 drives in the forward direction F. For example, the header 112 may include one or more cutter bars 114 located at or near the leading edge of the header 112 to cut crops at or near the ground level, and one or more reels 116 configured to pull the crop material backwards towards the header 112. The header 112 also may include crop conveyors 118 that are configured to move the crop material at the lateral ends of the header 112 towards the center of the header 112. The crop conveyors 118 may be in the form of belts, auger screws, or the like. At the center, the header 112 may include a infeed section 140 having a feeder conveyor 120 that conveys the crop material backwards towards a crop outlet 122. The header 112 also may include gauge wheels 124 or skids to control the height of the header 112 over the ground.

The header 112 is built on a frame 126, which is attached to the chassis 102 by a feeder housing 128. The feeder housing 128 is configured to convey crop material backwards from the header 112 to the threshing and separating system 106. The feeder housing 128 may be movable by one or more feeder housing actuators 130 to raise and lower the header 112 in a vertical direction V relative to the ground.

The illustrated exemplary header 112 is a unitary header having a single frame that extends continuously between the ends of the header 112 in the lateral direction L. In other embodiments, the header 112 may comprise a multi-segment or articulated header having a center section and one of more wing sections movably attached to the lateral end of the center section by pivots or linkages. In either case, the header 112 has a central region defined by the lateral extent of the crop outlet, and lateral regions extending in the lateral direction L from the central region.

The header 112 also includes a number of support arms 132 that extend forward from the frame 126 to hold parts such as the cutter bar 114, conveyors 118, or the like. The support arms 132 may be rigidly attached to the header 112, or attached by movable mounts, such as pivots or linkages. In the case of movable support arms 132, a suspension may be used to control the motion of the support arms 132. For example, each support 132 may have its own spring and/or damper system, which is intended to allow the support arms 132 to move up and down individually or in groups to follow local undulations along the lateral direction L. At the center of the header, the infeed frame 142 acts as the support arm for the cutter bar 114, and is similarly attached to the frame 126 and controlled as are the support arms 132. Skids, gauge wheels or other ground supports may be located below the support arms 132 to generate a lifting force via contact with the ground. The positions of the ground supports and the spring and damping properties of the movable connections may be adjustable to tailor the header 112 for use in particular operating conditions. In addition, the positions of the support arms 132 and infeed frame 142, such as their angular orientation (downward tilt) relative to the frame 126, may be adjustable.

In use, the header 112 cuts crop materials with the cutter bar 114, receives the crop materials on the conveyors 118, 120, and conveys the crop materials back through the crop outlet 122 to the threshing and separating system 106. The movement of the crop materials in the lateral regions of the header 112 is controlled, in part, by one or more backsheets 136. The backsheets 136 are located in the lateral regions of the header, at rear edges of the lateral conveyors 118, and prevent crop materials from falling behind the lateral conveyors 118. The backsheets 136 may slope backwards, as shown in FIG. 2, or they may be vertical or have other profiles.

In the example of FIG. 3, it can be seen that the support arms 132 and the infeed frame 142 extend forward from a main truss 138 of the header frame 126. The main truss 138 is located at a lower end of the frame 126, and extends in the lateral direction L. Thus, the main truss 138 acts as the structural backbone of the frame in holding the support arms 132 and infeed frame 142. Each support arm 132 and the infeed frame 142 are pivotally connected to the header frame 126 at a respective pivot 134.

For certain harvesting operations requiring cutting crops close to the ground, the support arms 132 and infeed frame 142 are freely movable relative to the header frame 126 in a state known as the flex mode, and the cutter bar 114 flexes up and down on the support arms 132 and infeed frame 142, tracking the local shape of the ground below each support arm 132 or infeed frame 142. For other operations, it is desirable or necessary to secure or lock the movable supports 132 and 142 to fix the cutter bar 114 in a stationary position with respect to the header frame 126 in a state known as the rigid mode. For example, the cutter bar support arms 132 and infeed frame 142 might be locked in a fully raised position during transport of the agricultural harvester 100 over fields and other terrain, to prevent the cutter bar 114 from bouncing or from striking the ground or other terrestrial obstacles that may be encountered in transit.

Figure 4:
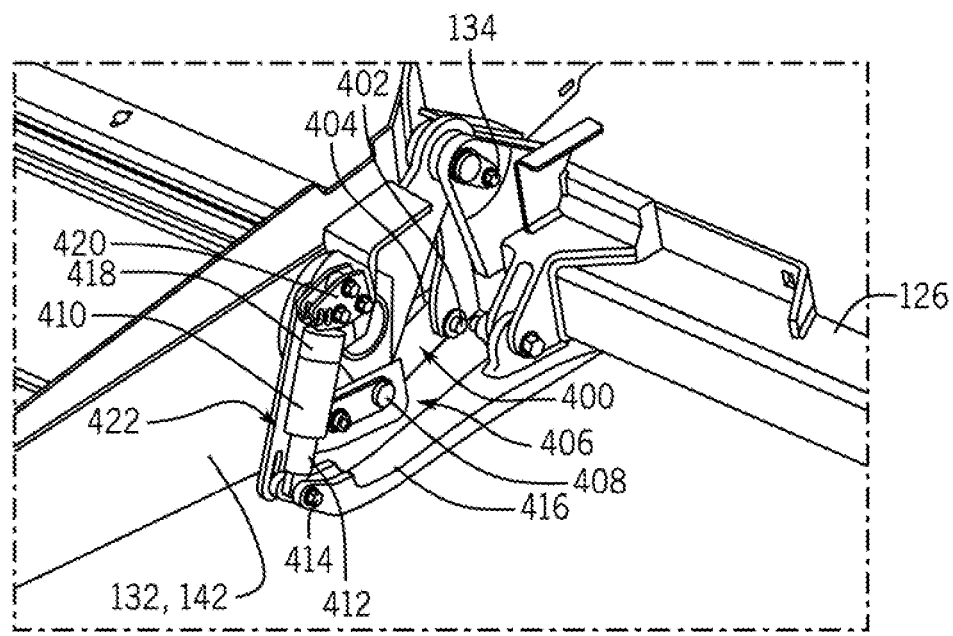
FIG. 4 is an isometric view of a portion of an exemplary embodiment of the cutter bar assembly.

Referring now to FIG. 4, a first example of a cutter bar assembly for an agricultural vehicle header is shown. The cutter bar assembly includes a header frame 126 and at least one support arm 132 extending from the header frame 126 in a forward direction. The support arm 132 is joined to the header frame 126 at an end proximal to the header frame 126 at pivot 134. In the embodiment shown in FIG. 4, the support arm 126 supports the cutter bar 114, but also functions as the infeed frame 142, supporting the feeder conveyor 120, only the left side of which appears in the detail of FIG. 4; a right side of the infeed frame 142 similarly extends from the header frame 126 and joins the header frame at a respective pivot 134. The cutter bar 114 (not shown in FIG. 4) is attached to a respective distal end of the support arm 132 or infeed frame 142. For purposes of the cutter bar assembly, the support arm 132 and infeed frame 142 are interchangeable.

At a first end 404, a stop link 400 joins the header frame 126 to the support arm 132/infeed frame 142 at a point 402 distal from the pivot 134 joining the support arm 132/infeed frame 142 to the header frame 126. A second end 406 of the stop link 400 joins the support arm 132/infeed frame 142 at point 408. The first end 404 of the stop link 400 may be joined to the header frame 126 at point 402 by a sliding joint, in which case the second end 406 of the stop link 400 is joined to the support arm 132/infeed frame 142 by a pivot. Alternately, the second end 406 of the stop link 400 may be joined to the support arm 132/infeed frame 142 at point 408 by a sliding joint, in which case the first end 404 of the stop link 400 would be joined to the header frame 126 at point 402 by a pivot. In either configuration, the sliding joint of the stop link 400 defines a range of motion for the support arm 132/infeed frame 142 as is rotates at pivot 134.

A hydraulic actuator 410 is joined at first end 412 to the header frame 126 by a pivot 414 attached to the header frame 126 by support arm 416 and at a second end 418 to the support arm 132/infeed frame 142 by a sliding joint 420. The hydraulic the actuator can lift and hold the support arm 132/infeed frame 142 in a raised position in a rigid mode, wherein the sliding joint joining the hydraulic actuator 410 to the support arm 132/infeed frame 142 and the sliding joint of the stop link 400 enable the support arm 132/infeed frame 142 to move upward from the raised position in the rigid mode when the support arm 132/infeed frame 142 is subjected to a lifting force distal from the infeed frame 126. An actuator link 422 is joined to the header frame 126 by support arm 416 and to the support arm 132/infeed frame 142 in parallel with the hydraulic actuator 410 for limiting the extension or compression travel of the hydraulic actuator 410 to prevent damage to the actuator from over-extension or over-compression.

Figure 5:
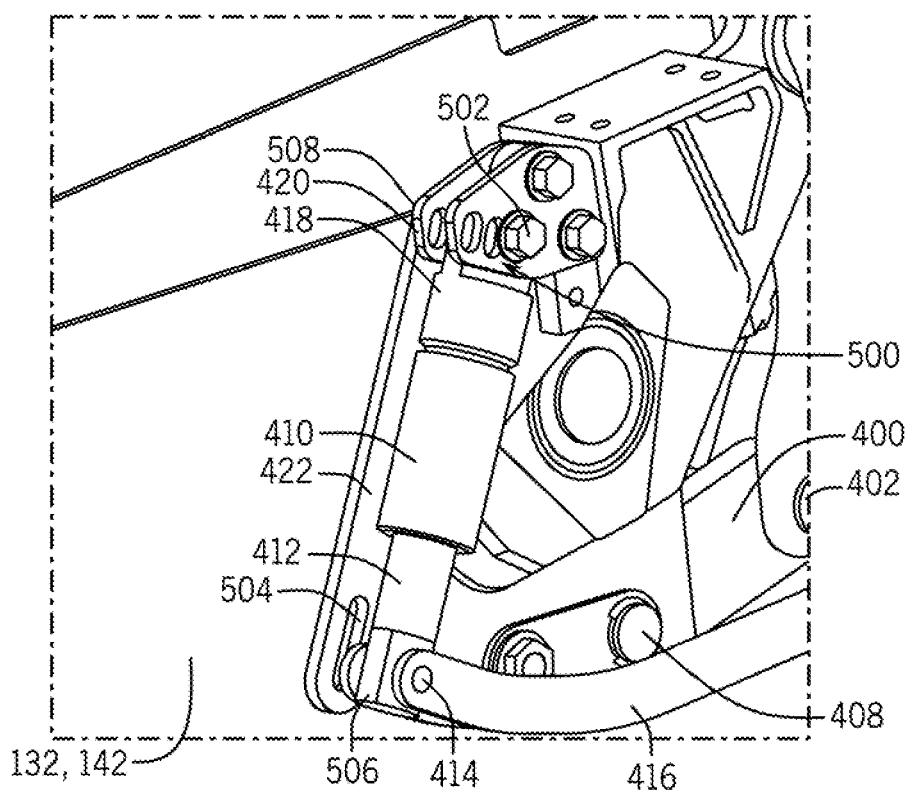
FIG. 5 is an isometric detail of a portion of an exemplary embodiment of the cutter bar assembly, showing the connection of the hydraulic actuator and actuator link to the infeed frame.

FIG. 5 shows the arrangement of the hydraulic actuator 410 and the actuator link 422 in greater detail. The hydraulic actuator 410 is joined to the support arm 132/infeed frame 142 by a sliding joint 420. The sliding joint 420 is a pin slot joint formed by a slot 500 fixed to the support arm 132/infeed frame 142 and a pin 502 fixed to the second end 418 of the hydraulic actuator 410. The hydraulic actuator 410 is joined to the header frame 126 by a pivot 414 fixed to header frame 126 by support arm 416. In alternative embodiments (not shown), sliding joint 420 may comprise an open slot, rather than the closed slot shown, or a linkage, such as a parallel linkage.

The actuator link 422 is joined to the header frame 126 by a sliding joint formed by a slot 504 in the actuator link 422 and a pin 506 fixed to the header frame 126 by the support arm 416. The actuator link 422 is joined to the support arm 132/infeed frame 142 by a pivot 508. In an alternative arrangement (not shown), the actuator link 422 can be attached to the support arm 132/infeed frame 142 by a sliding joint and to the header frame 126 by a pivot; in a further alternative arrangement (also not shown), the actuator link 422 can be attached to both the support arm 132/infeed frame 142 and the header frame 126 by a sliding joint. In all arrangements the actuator link 422 limits the travel of the actuator 410 to prevent damage by over-compression or over-extension.

Figure 6:
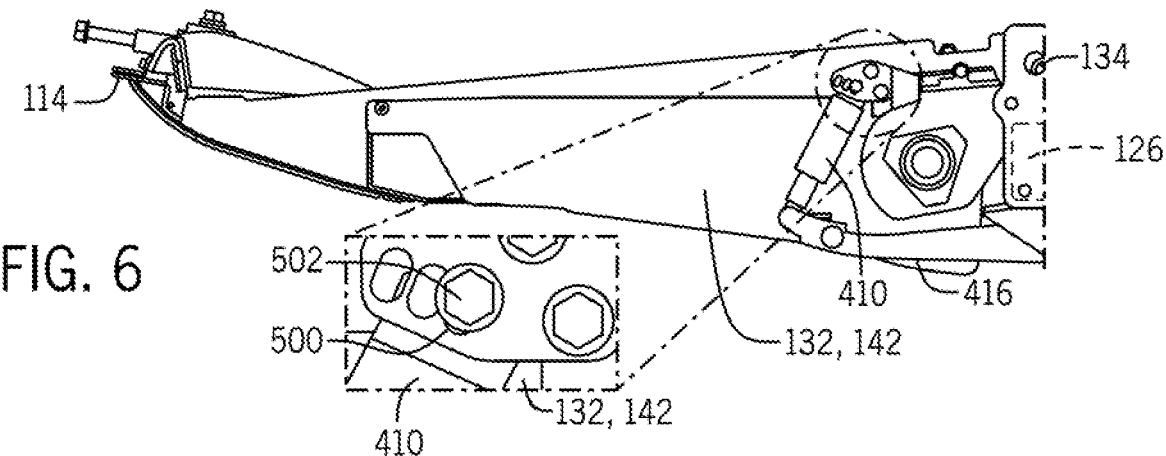
FIG. 6 is a side view of an exemplary embodiment of the cutter bar assembly, showing the infeed frame in the rigid position, including a breakout detail view of the connection of the hydraulic actuator to the infeed frame.
Figure 7:
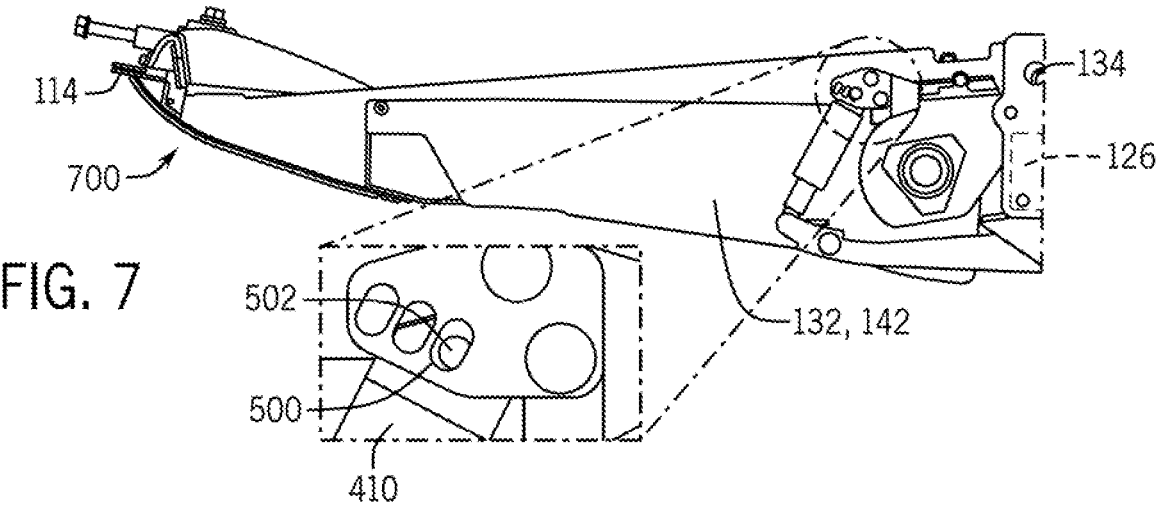
FIG. 7 is a side view of an exemplary embodiment of the cutter bar assembly, showing the infeed frame in the over-traveled position, including a breakout detail view of the connection of the hydraulic actuator to the infeed frame.
Figure 8:
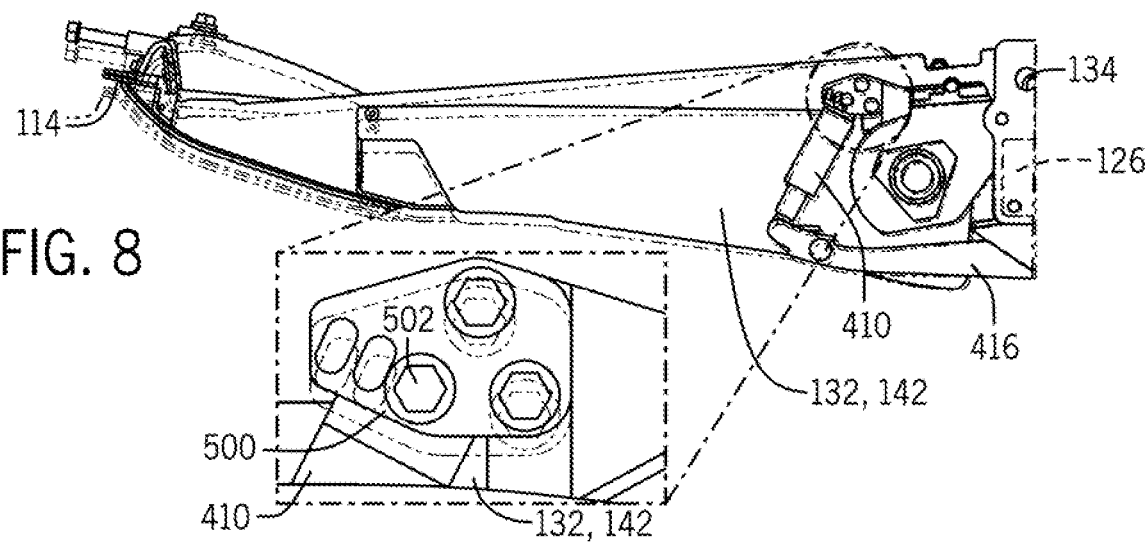
FIG. 8 is a side view of an exemplary embodiment of the cutter bar assembly, showing the infeed frame in the rigid and over-traveled positions, including a breakout detail view of the connection of the hydraulic actuator to the infeed frame.

FIGS. 6, 7, and 8 show the cutter bar assembly in various modes of operation, including a breakout detail view of the connection of the hydraulic actuator 410 to the support arm 132/infeed frame 142. FIG. 6 shows the cutter bar assembly in the rigid, raised position, FIG. 7 shows the cutter bar in over-traveled position, and FIG. 8 shows the cutter bar assembly in rigid raised position and over-traveled position in superimposition.

Referring to FIG. 6, the cutter bar assembly is shown in the raised rigid operating mode. In this mode, the hydraulic actuator 410 has extended fully as limited by actuator link 422 (not visible) and lifted the support arm 132/infeed header 142 and the cutter bar 114 in the raised position relative to header frame 126 as the support arm 132/infeed header 142 rotates about pivot 134. As can be seen in the breakout, the extension of the hydraulic actuator 410 has forced pin 502 to the top of slot 500, where the weight of support arm 132/infeed header 142 and components attached to support arm 132/infeed header 142, e.g. the cutter bar 114, infeed conveyor 120, and related structures rests upon pin 502.

Referring to FIG. 7, the cutter bar assembly is shown in the over-traveled operating mode. In this mode, the hydraulic actuator 410 has extended fully as limited by actuator link 422 (not visible) and lifted the support arm 132/infeed header 142 and the cutter bar 114 in the raised position relative to header frame 126 as shown in FIG. 6, but because of an obstacle 700 imparting an upward force to the support arm 132/infeed header 142, slot 502 is raised until pin 502 has stopped at the bottom of slot 502. As can be seen in the breakout, the further rotation of support arm 132/infeed header 142 about pivot 134 extension due to the obstacle 700 has forced pin 502 to the bottom of slot 500, where slot 500 stops any further travel of support arm 132/infeed header 142 beyond the rigid mode position.

Referring to FIG. 8, images of the cutter bar assembly in the rigid and over-traveled positions are superimposed, and the differences in positions of the components in the two modes can be seen. Between the rigid and over-traveled modes, pin 502 remains in place, but slot 500 rises from its position in the rigid mode until pin 502 reaches the lower limit of slot 500 as support arm 132/infeed header 142 is rotated about pivot 134 by obstacle 700 and cutter bar 114 is raised.

Figure 9:
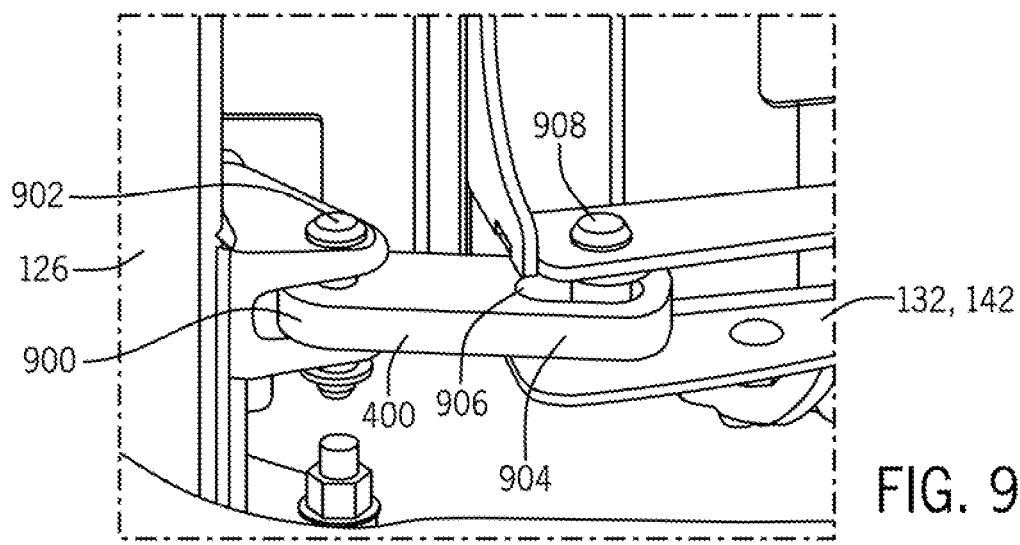
FIG. 9 is an isometric detail of a portion of an exemplary embodiment of the cutter bar assembly, showing the stop link in the rigid operating mode while the infeed frame is in the raised position.
Figure 10:
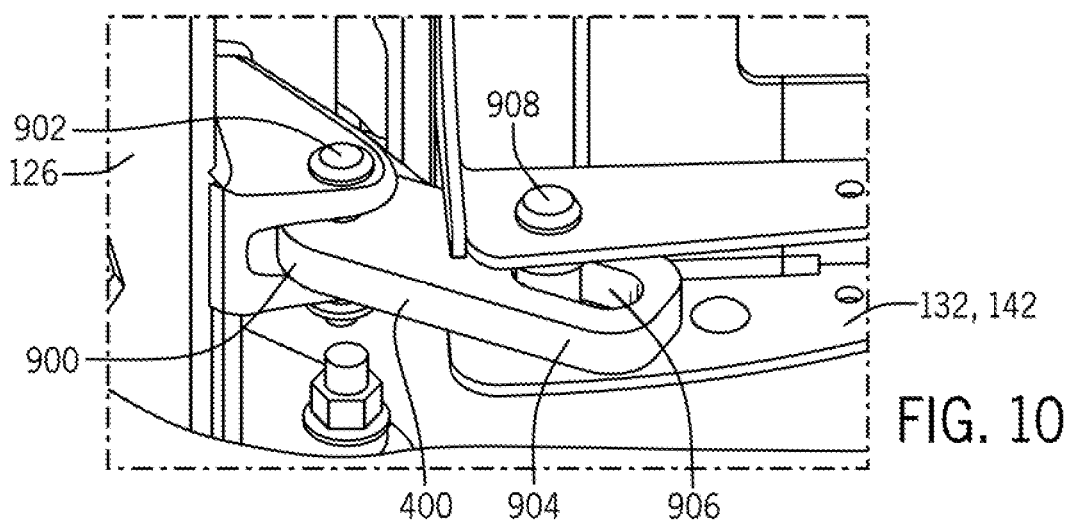
FIG. 10 is an isometric detail of a portion of an exemplary embodiment of the cutter bar assembly, showing the stop link in the flex operating mode while the infeed frame is in the fully lowered position.
Figure 11:
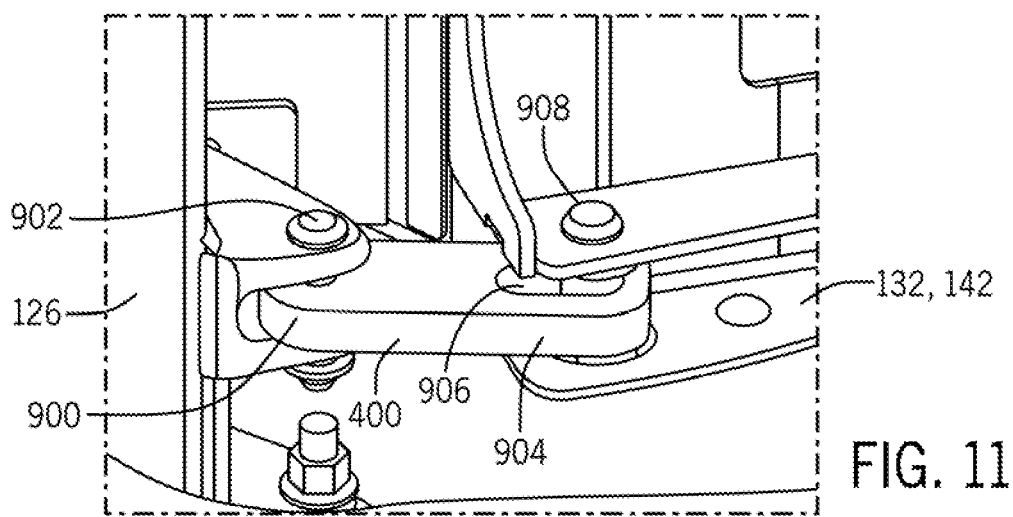
FIG. 11 is an isometric detail of a portion of an exemplary embodiment of the cutter bar assembly, showing the stop link in the over-traveled position.

FIGS. 9, 10, and 11 show stop link 400 in various modes of operation. FIG. 9 shows the stop link 400 in the rigid, raised position, FIG. 10 shows the stop link in the fully-down position in flex mode, and FIG. 11 shows the stop link in the over-traveled position.

Referring to FIG. 9, stop link 400 is joined to header frame 126 at a first end 900 by a pivot 902 and at a second end 904 to the support arm 132/infeed frame 142 by a pin slot joint formed by a slot 906 in the stop link 400 and a pin 908 fixed to the support arm 132/infeed frame 142. In an alternative arrangement (not shown), the pivot joint and the pin slot joint on stop link 400 are reversed, such that the stop link 400 is joined to the header frame 126 by a sliding joint and to the support arm 132/infeed frame 142 by a pivot joint. Pivot 902 (or in the alternative, the sliding joint joining stop link 400 to header frame 126) is located distal from and below the pivot 134 (not shown) joining the support arm 132/infeed frame 142 to the header frame 126. Slot 906 is sized such that when the support arm 132/infeed frame 142 is in the raised position in the rigid mode, pin 908 has not reached the end of slot 906. Thus the stop link permits the support arm 132/infeed frame 142 to move upward, rotating about pivot 134 attached to header frame 126, beyond the position in the rigid mode when support arm 132/header frame 142 is subjected to a lifting force due to, for example, striking an obstacle while the cutter bar assembly is in rigid mode, until the pin 908 reaches the end of the slot 906.

Referring to FIG. 10, stop link 400 is shown in the fully-down flex mode position. In this position, hydraulic actuator 410 is deactivated, allowing support arm 132/infeed frame 142 to rotate downward about pivot 134 (not shown) until pin 908 reaches the end of slot 906 proximate to header frame 126. In this position, support arm 132/infeed header 142 may move freely within the limits of travel of pin 908 in slot 906.

Referring to FIG. 11, stop link 400 is shown in the over-traveled position. In this mode, the support arm 132/infeed header 142 and the cutter bar 114 (not shown) have been raised position relative to header frame 126 in the rigid mode, but an upward force to the support arm 132/infeed header 142 has moved the support arm 132/infeed frame 142 past the rigid raised position. The further rotation of support arm 132/infeed header 142 about pivot 134 (not shown) has moved pin 908 to the end of slot 906 distal from header frame 126, where slot 906 stops any further travel of support arm 132/infeed header 142 beyond the rigid mode position. Stop link 400 can be provided with a strain gauge sensor or a load cell sensor (not shown) for detecting when the support arm 132/infeed frame 142 reaches the over-traveled position and signalling a header position control system to adjust the header 112 position accordingly. Stop link 400 can further incorporate a spring (not shown) to allow the support arm 132/infeed frame to move into the over-traveled position from the raised rigid position without damaging any components.

Figure 12:
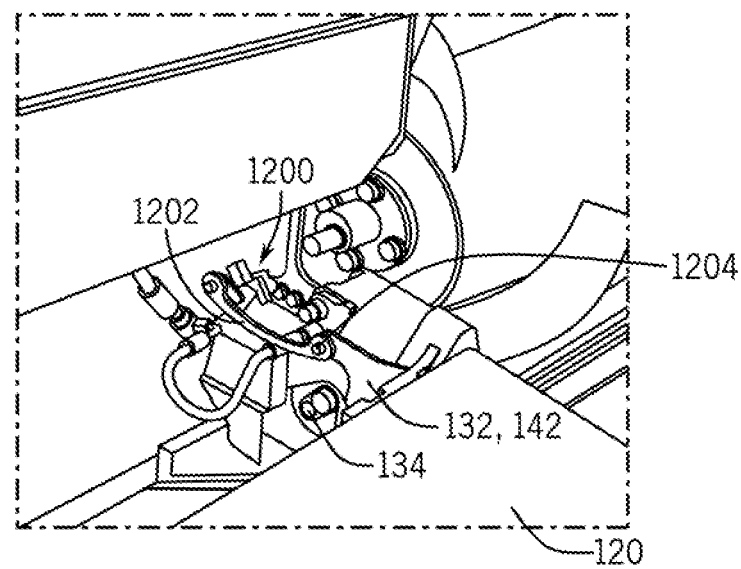
FIG. 12 is an isometric detail of an exemplary embodiment of the cutter bar assembly, showing the infeed frame position sensor.

In FIG. 12, a position sensor 1200 is connected to the support arm 132/infeed frame 142 by link 1202 at pivot 1204 for detecting when the support arm 132/infeed frame 142 is rotated about pivot 134 from the raised position in the rigid mode by a lifting force at the distal end of the support arm 132/infeed frame 142. The position sensor 1200 can signal a header position control system when the support arm 132/infeed frame reaches the over-traveled position to enable the header position control system to adjust the header 112 position accordingly.

Figure 13:
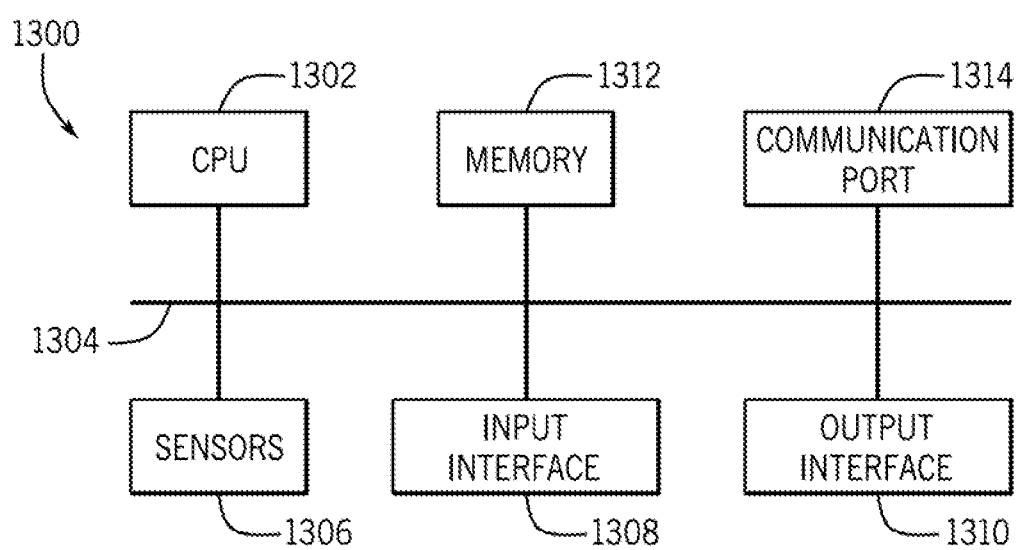
FIG. 13 is a schematic view of a control system.

An example of a header position control system 1300 is shown in FIG. 13. The control system 1300 may be implemented using any suitable arrangement of processors and logical circuits. FIG. 13 is a block diagram of exemplary hardware and computing equipment that may be used as a control system 1300. The control system 1300 includes a central processing unit (CPU) 1302, which is responsible for performing calculations and logic operations required to execute one or more computer programs or operations. The CPU 1302 is connected via a data transmission bus 1304, to sensors 1306 (e.g., position sensors 1200 or sensors on stop link 400), an input interface 1308, an output interface 1310, and a memory 1312. The input and output interfaces 1308, 1310 may comprise any suitable user-operable and perceivable system, such as a touchscreen controller/display, control knobs or joysticks, and the like. One or more analog to digital conversion circuits may be provided to convert analog data from the sensors 1306 to an appropriate digital signal for processing by the CPU 1302, as known in the art. The CPU 1302 also may be operatively connected to one or more communication ports 1314, such as serial communication ports, wireless communication ports (e.g., cellular or Bluetooth communication chipsets), or the like.

The CPU 1302, data transmission bus 1304 and memory 1312 may comprise any suitable computing device, such as an INTEL ATOM E3826 1.46 GHz Dual Core CPU or the like, being coupled to DDR3L 1066/1333 MHz SO-DIMM Socket SDRAM having a 4 GB memory capacity or other memory (e.g., compact disk, digital disk, solid state drive, flash memory, memory card, USB drive, optical disc storage, etc.). The selection of an appropriate processing system and memory is a matter of routine practice and need not be discussed in greater detail herein.

Embodiments may be provided in various forms. In one instance, an embodiment may comprise an entire vehicle and header assembly, and the cutter bar assembly may be integrated into the header or into the vehicle. In another instance, an embodiment may comprise a header and an associated control system. Other configurations may be used in other embodiments.

The present disclosure describes a number of inventive features and/or combinations of features that may be used alone or in combination with each other or in combination with other technologies. It will be appreciated that embodiments may include any combination of support arms and associated linkages. For example, a header may have a combination of assemblies as shown in FIGS. 4 through 12. One or more conventional support arms also may also be used in combination with one or more embodiments such as those described above. Other alternatives and variations will be apparent to persons of ordinary skill in the art in view of the present disclosure.

The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

What is claimed:

1. A cutter bar assembly for an agricultural vehicle header, comprising:
   a header frame;
   at least one support arm extending from the header frame in a forward direction, the support arm joined to the header frame at an end proximal to the header frame by a pivot;
   a cutter bar attached to a respective distal end of each at least one support arm;
   a stop link comprising first and second ends, wherein the first end joins one of the header frame or the support arm by a pivot and the second end joins the other of the header frame or the support arm by a sliding joint, and wherein the stop link joins the header frame at a point distal from the pivot joining the support arm to the header frame; and
   a hydraulic actuator joined at one end to the header frame by a pivot and at an opposite end to the support arm by a sliding joint;
   wherein the actuator can lift and hold the support arm in a raised position in a rigid mode and wherein the sliding joint joining the hydraulic actuator to the support arm and the stop link enable the support arm to move upward from the raised position in the rigid mode when the support arm is subjected to a lifting force at its distal end.

2. The cutter bar assembly of claim 1, wherein the at least one support arm comprises an infeed frame.

3. The cutter bar assembly of claim 1, wherein the sliding joint of the stop link comprises a pin slot joint comprising a slot in the link and a pin fixed respectively to the header frame or the support arm.

4. The cutter bar assembly of claim 1, wherein the stop link is joined by a pivot to the support arm and by a sliding joint to the header frame.

5. The cutter bar assembly of claim 1, wherein the stop link is joined to the header frame at a point below the pivot joining the support arm to the header frame.

6. The cutter bar assembly of claim 1, wherein the sliding joint joining the actuator to the support arm comprises a pin slot joint comprising a pin fixed to the actuator and a slot fixed to the support arm.

7. The cutter bar assembly of claim 1, further comprising an actuator link joined to the header frame and support arm in parallel with the hydraulic actuator to limit travel of the hydraulic actuator.

8. The cutter bar assembly of claim 7, wherein the actuator link is joined to the header frame and support arm by at least one sliding joint.

9. The cutter bar assembly of claim 8, wherein the sliding joint comprises a slot in the actuator link and a pin fixed respectively to either of the header frame and the support arm.

10. The cutter bar assembly of claim 1, wherein the stop link comprises a spring.

11. The cutter bar assembly of claim 1, wherein the stop link comprises a strain gauge sensor or a load cell sensor for detecting when the support arm is subjected to a lifting force at its distal end.

12. The cutter bar assembly of claim 1, wherein the support arm comprises a position sensor for detecting when the support arm is moved upward from the raised position in the rigid mode by a lifting force at its distal end.

13. An agricultural vehicle header, comprising the cutter bar assembly of claim 1.

14. The header of claim 13, comprising a header position control system.

15. The header of claim 14, wherein the cutter bar assembly further comprises a position sensor for detecting when the support arm is moved upward from the raised position in the rigid mode by a lifting force at its distal end and signalling the header position control system to raise the header.

16. The header of claim 13, wherein the stop link comprises a strain gauge sensor or a load cell sensor for detecting when the support arm is subjected to a lifting force at its distal end and signalling the header position control system to raise the header.

17. An agricultural combine harvester, comprising the header of claim 13.

18. A cutter bar assembly for an agricultural vehicle header, comprising:
a header frame;
an infeed frame extending from the header frame in a forward direction, the infeed frame joined to the header frame at an end proximal to the header frame by a pivot;
a cutter bar attached to a respective distal end of the infeed frame;
a stop link joined by a pivot to the infeed frame and by a pin slot joint to the header frame, wherein the pin slot joint comprises a slot in the stop link and a pin fixed to the header frame at a point below the pivot joining the infeed frame to the header frame; and
a hydraulic actuator joined at one end to the header frame by a pivot and at an opposite end to the support arm by a sliding joint comprising a pin slot joint comprising a pin fixed to the actuator and a slot fixed to the infeed frame, wherein:
the actuator can lift and hold the infeed frame in a raised position in a rigid mode;
the sliding joint joining the hydraulic actuator to the infeed frame and the stop link enable the infeed frame to move upward from the raised position in the rigid mode when the infeed frame is subjected to a lifting force at its distal end;
the cutter bar assembly further comprises an actuator link joined by sliding joints to the header frame and infeed frame in parallel with the hydraulic actuator to limit travel of the hydraulic actuator, wherein the sliding joints joining the actuator link to the header frame and infeed frame comprise a slot in the actuator link and a pin fixed respectively to each of the header frame and the infeed frame; and
the cutter bar assembly further comprises a position sensor for detecting when the infeed frame is moved upward from the raised position in the rigid mode by a lifting force at its distal end.

19. An agricultural vehicle header, comprising the cutter bar assembly of claim 18 and a header position control system, wherein the infeed frame position sensor signals the header position control system to raise the header when the position sensor detects the infeed frame is moved upward from the raised position in the rigid mode by a lifting force at its distal end.

20. An agricultural combine harvester, comprising the header of claim 19.

* * * * *